United States Patent [19]

Wilcox

[11] Patent Number: 4,553,643
[45] Date of Patent: Nov. 19, 1985

[54] DISC BRAKE FOR TRUCKS

[76] Inventor: Charles F. Wilcox, Box 3, Bartlesville, Okla. 74003

[21] Appl. No.: 549,796

[22] Filed: Nov. 9, 1983

[51] Int. Cl.$^4$ ............................................. F16D 65/56
[52] U.S. Cl. ................................... 188/71.9; 188/72.8
[58] Field of Search ................... 188/71.9, 72.7, 72.8, 188/73.39, 73.45, 196 BA, 18 A

[56] References Cited

U.S. PATENT DOCUMENTS

| 3,114,436 | 12/1963 | Larson | 188/72.8 X |
| 3,243,016 | 3/1966 | Swift | 188/72.7 X |
| 4,014,411 | 3/1977 | Troester | 188/72.8 X |
| 4,278,152 | 7/1981 | Tosi | 188/72.8 X |

FOREIGN PATENT DOCUMENTS

| 2547083 | 5/1976 | Fed. Rep. of Germany | 188/73.45 |
| 2651539 | 5/1977 | Fed. Rep. of Germany | 188/73.45 |
| 1373940 | 8/1964 | France | 188/72.8 |

Primary Examiner—Duane A. Reger
Attorney, Agent, or Firm—Head, Johnson & Stevenson

[57] ABSTRACT

A brake system for a vehicle having an axle supporting a wheel hub including a disc on the axle adjacent the hub, a housing supported by the vehicle in proximity to the disc, the housing having an opening therein which is perpendicular the disc planar surfaces, a pad support slideably and non-rotatably received in the housing opening, the pad support having a pad on the outer end and on the inner end having a surface defined by two intersecting planes, an actuator rotatably supported within the housing having a forward surface defined by two intersecting planes, the forward surface engaging the pad support forward end, the actuator upon rotation causing the angled inter-relationship of the pad support forward face with the actuator rearward face serving to axially displace the pad support, and bolts extending beyond the disc supporting a pad on the opposite side of the disc, the bolts being connected to the housing so that as the actuator is rotated force is applied to the pads against the opposed surfaces of the disc to apply braking force.

3 Claims, 5 Drawing Figures

DISC BRAKE FOR TRUCKS

SUMMARY OF THE INVENTION

Many designs exist for brake systems for vehicles and the presently employed brake systems are usually of two basic types. One type utilizes a drum having a cylindrical surface. The brake functions by outwardly extending semicircular pads to engage the drum interior cylindrical surface to apply braking force. The second basic type of brake system employs a disc having opposed paralleled planar surfaces. By the application of pads to the opposed surfaces frictional force is applied to the disc to break the rotation of the disc. The present invention is directed towards this second basic type of brake system and particularly to an improved disc brake system useful for trucks, however the principles of the invention may be applicable to any type of vehicle.

The brake system includes a brake disc mounted coaxially on an axle adjacent to a wheel receiving hub. The disc has inboard and outboard parallel planar surfaces, the outboard surface being adjacent the vehicle wheel hub. The housing has an opening through it of varying dimensions, the longitudinal axis of the opening being perpendicular the disc planar inboard surface.

Positioned within the housing is a pad support. It is slideably and non-rotatably received within the housing and extends partially exteriorally of the housing rearward end. The forward end of the pad support is defined by two planes intersecting a plane of the pad support longitudinal axis at equal obtuse angles so that, in cross-section, the pad support forward end defines an obtuse V.

An actuator member is rotatably supported within the housing opening. The actuator member has a shaft portion which extends externally of the housing forward end and has a rearward face defined by two planes intersecting at equal obtuse angles to the plane of the shaft axis. The end surface of the actuator defines a V. The rearward end face of the actuator engages the pad support forward end in a mating relationship. A first brake pad is affixed to the pad support rearward end.

An outboard pad is supported by means affixed to the housing which extends past the disc outboard planar surface. A second brake pad is affixed to the outboard pad support means and is positioned in close proximity to the disc outboard surface.

The brake is applied by rotating the actuator member. This can be done by means of pneumatic, hydraulic, electrical or mechanical force. Upon rotation of the actuator the interaction of the V-shaped actuator rearward face with the pad support forward face causes the pad support to be axially displaced, forcing the pad carried by it to engage the disc. This force also applies a force against the housing which is transmitted to the outboard pad support to apply force of the pad carried by it against the disc outboard surface. Thereby, a frictional braking force is applied against both opposed surfaces of the disc.

An important concept of the invention is means of automatically adjusting the brake so that the proper position of the pad support is obtained. This is achieved by a tubular actuator locator slideably and non-rotatably supported within the opening within the housing. The tubular actuator is internally threaded. An externally threaded tubular ratchet member is received within the actuator locator and has parallel, evenly spaced slots on its internal surface, the slots being in planes of the tubular axis. Affixed to the actuator shaft is a pawl member which engages the slots in the tubular ratchet member. As the actuator is rotated to apply braking force the pawl will move to engage successive slots in the tubular ratchet member when the motion required to apply the braking force is sufficient to permit the pawl to advance a space between adjacent slots. In this manner, when wear on the brake pads has proceeded to a point wherein additional rotative motion is required to apply braking action, the pawl member will rotatably move the tubular ratchet member which, by its threaded inner action with the actuator locator, will advance it to move the actuator in closer proximity to the pad support so that upon the next brake application less rotation of the actuator will be required.

The invention will be more thoroughly understood in conjunction with the attached specifications of a preferred embodiment, taken in conjunction with the attached drawings.

DESCRIPTION OF THE PREFERRED EMBODIMENT

Figure 1:
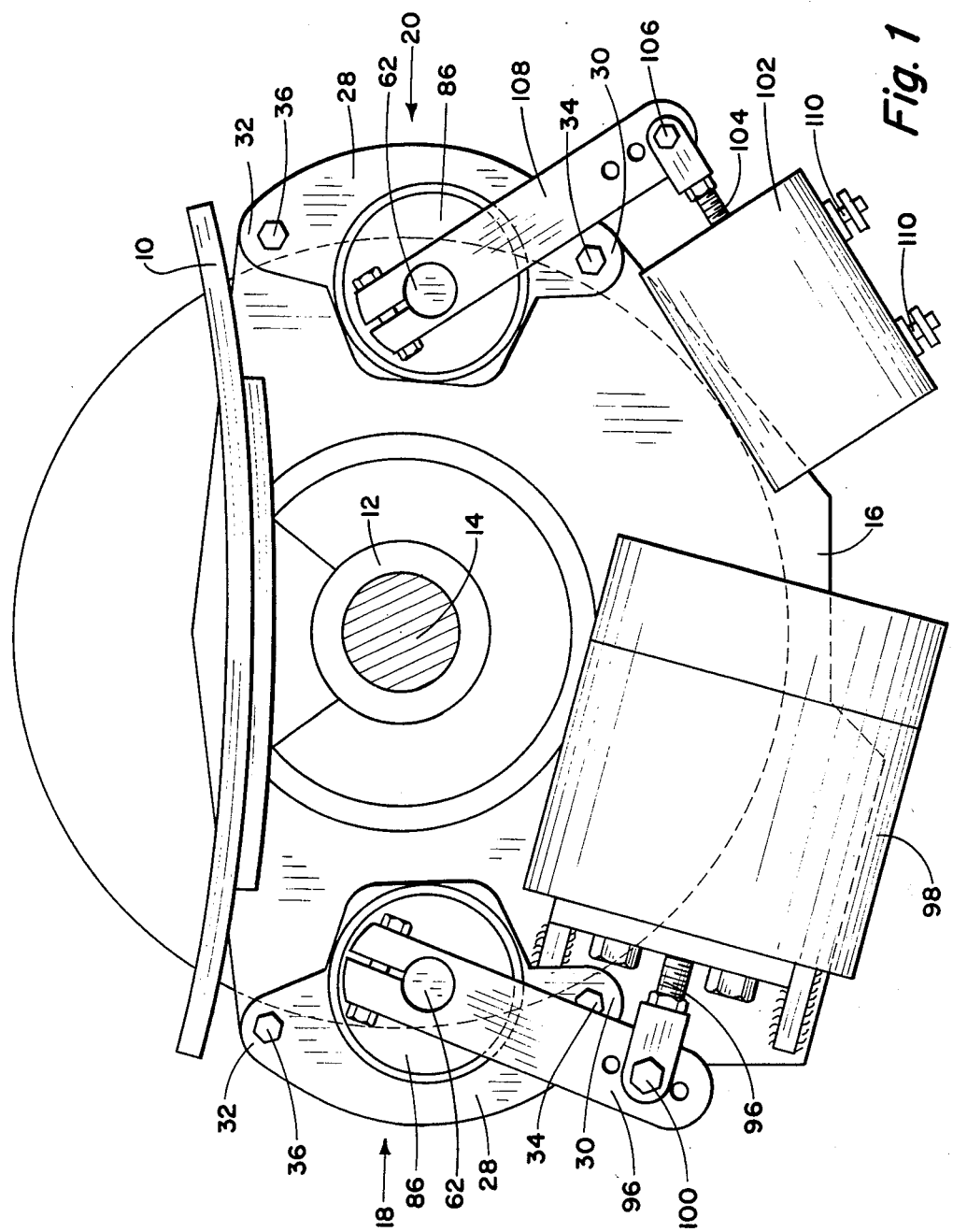
FIG. 1 is an elevational view of a portion of a vehicle including a rear axle having a brake disc and having the improved brake system of this invention mounted for applying braking force to the disc.

Referring to the drawings and first to FIG. 1 an embodiment of the invention is illustrated, it being understood that in the actual practice of the principles of this invention the mechanism employed may appear completely dissimilar from that shown in the drawings. FIG. 1 shows a portion of a vehicle suspension system including springs 10 which extend from the body portion of the vehicle (not shown) supporting an axle housing 12 having an axle 14 therein. Secured to the vehicle suspension system is a plate member 16 which supports the brake system. It is understood that the plate member 16 may be supported to the vehicle suspension system in a great variety of ways which are not directly related to the practice of the invention.

Affixed to the plate member 16 are two caliper brake systems indicated generally by the numerals 18 and 20. The systems 18 and 20 are identical except for the method of applying rotational force to actuate the brake system which will be described subsequently.

The invention is directed towards the arrangement of the brake systems 18 and 20, and by reference to FIG. 2 the brake system will be described.

The vehicle brake disc is identified by the numeral 22. This is a circular plate member secured to and rotated with axle 14. The brake disc has a planar outboard surface 24 and a paralleled planar inboard surface 26. The outboard surface 24 will normally be adjacent to a wheel hub (not shown), the hub being adaptable to support a wheel (not shown) of a vehicle. By applying frictional force against the brake disc outboard and inboard surfaces 24, 26, braking action is applied to the vehicle.

A housing 28 has oppositely extending ears 30 and 32. Each of the ears has an opening therethrough indicated by the 30A and 32A respectively. The plate 16 has openings 16A and 16B therein. Received within the openings 30A and 16A is a first bolt 34 and, in like manner received in openings 32A and 16B is a paralleled bolt 36. Bolts 34 and 36 extend outside the peripherial surface of disc 22. Mounted to the outer end of bolts 34 and 36 is an outboard pad support 38. Secured to it is an outboard pad 40, one surface of which engages the disc outboard planar surface 24.

The housing 28 has an opening 42 through it, the axis of the opening being parallel bolts 34 and 36.

Received in opening 42 is a pad support member 44. To retain the pad support 44 in slideable but non-rotatable position within opening 42, key ways 44A and 44B are formed in the outer cylindrical surface, the key ways being in a plane of the pad support cylindrical axis. Matching key ways 46A and 46B are formed in housing 28. Keys 48A and 48B are received in key ways 44A and 48A and key ways 44B and 46A. Thus it can be seen that by the provision of the key ways which receive keys 48A and 48B the pad support 44 cannot rotate but it can be displaced along the cylindrical axis of opening 42 within the housing.

The pad support 44 receives on its rearward end a brake pad 50 which matches and is opposed to the first brake pad 40. The inboard pad 50 is in proximity to the disc inboard surface 26. The pads 40 and 50 may be held in position in a variety of ways. In the illustrated arrangement, the outboard pad support 38 has an opening 52 therein of a diameter less than the external diameter of pad 40. Integrally formed with pad 40 is a co-axial reduced diameter portion 40A received in opening 52. Thus the pad is held in position by the reduced diameter portion 40A. In like manner, the pad support 44 has a cylindrical recess 54 in its outboard end, the diameter of the cylindrical recess 54 is preferably of the diameter of opening 52. The inboard pad 50 has an integral portion 50A of reduced diameter compared to the pad, the integral portion being received in the recess 54. Thus the pads 40 and 50 may be identically formed with their integral portions 40A and 50A respectively to be interchangeably used in the brake system.

The pad support 44 is defined at its forward end by planar surfaces 56 and 58 which intersect each other at an obtuse angle. The planes defining the surfaces 56 and 58 intersect a plane of the pad longitudinal axis at equal angles so that in cross-section the pad support forward end is defined by an obtuse V as clearly shown in FIG. 2.

Rotatably positioned in opening 42 is an actuator 60 having an integral co-axial forwardly extending shaft 62. The rearward end of the actuator has a face defined by planar portion 64 and 66 which intersect at an obtuse angle corresponding to the angle of intersection of surfaces 56 and 58 of the pad support 44.

Figures 4, 5:
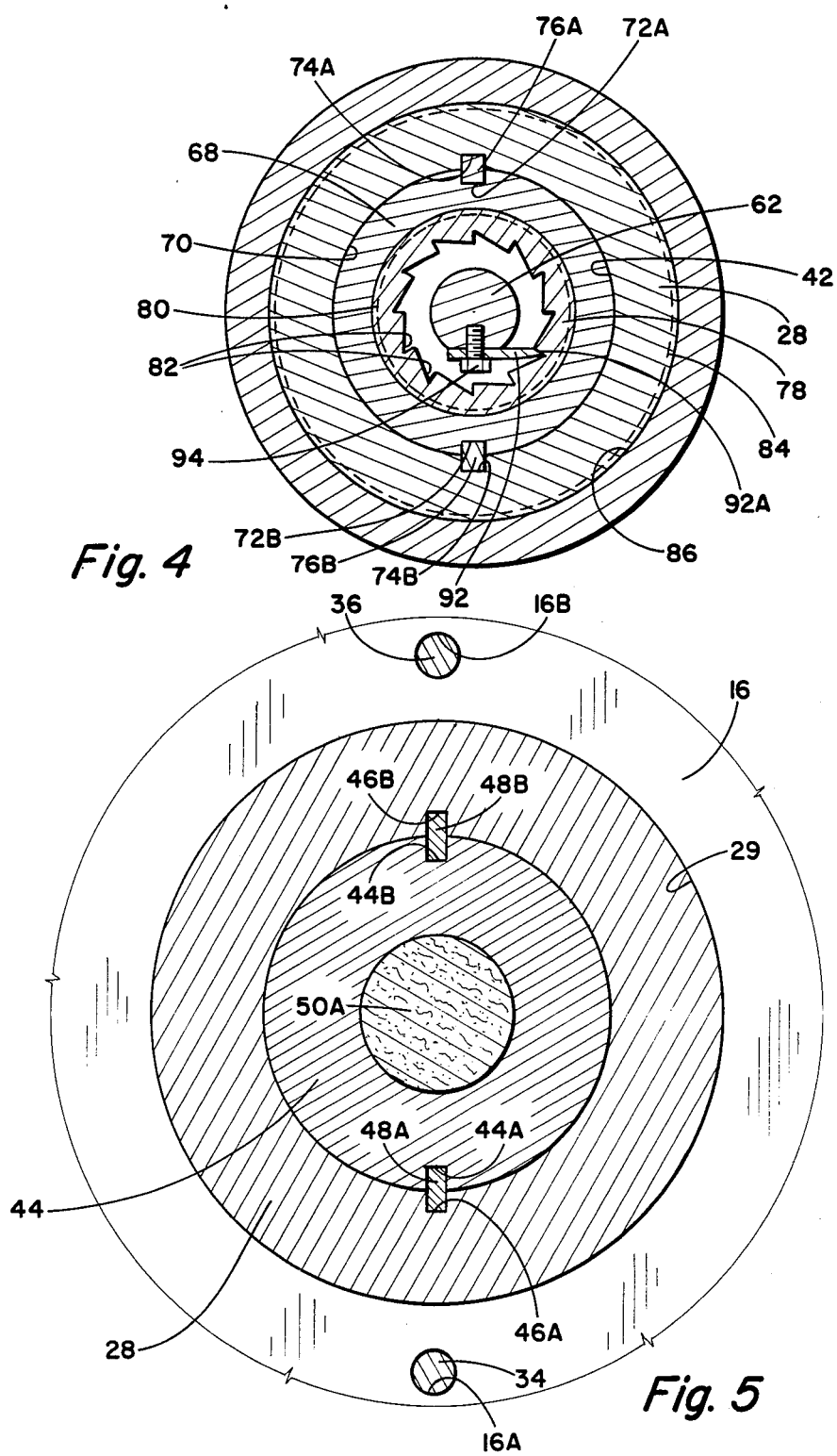
FIG. 4 is a cross-sectional view taken along the line 4—4 of FIG. 2 showing details of the automatic adjusting mechanism of the invention.
FIG. 5 is a cross-sectional view taken along the line 5—5 of FIG. 2 showing the mounting of the pad support within the housing.

Received within opening 42 is a tubular actuator locator member 68 provided with internal threads 70. The locator is held in a slideable but non-rotatable position within opening 64 by the provision of key ways 72A and 72B which match key ways 74A and 74B formed in the interior surface 42 of housing 28. Received in the matched key ways are keys 76A and 76B (See FIG. 4). The rearward end of locator member 68 engages the rearward surface of the enlarged diameter portion of actuator 60 to hold it in position within the housing.

Received within locator member 68 is a tubular ratchet member 78 having an external threaded surface 78A engaging the locator member internal threads 70. The internal tubular surface of the ratchet member 78 is provided with parallel evenly spaced slots 82, the slots being in planes of the tubular axis.

The external forward end of housing 28 is provided with threads 84 which receive an internally threaded end cap 86, the threads of the end cap being indicated by the numeral 88. End cap 86 has an opening 90 receiving actuator shaft 62. The forward end of the tubular ratchet member 78 engages the inner surface 86A of the end cap. It can thus be seen that the position of the actuator 60 is controlled by the threaded relationship between the ratchet member 78 and the locator member 68.

Affixed to the external surface of shaft 62 and extending in a plane perpendicular the shaft longitudinal axis is a pawl member 92, held to shaft 62 by a bolt 94 the outer end 92A of the pawl member engages slots 82 formed in the ratchet member 78.

Referring back to FIG. 1, apparatus for operating the brake system is shown. In the left hand part of the Figure it is shown attached to shaft 62 extending through end cap 86 from housing 28 an arm 96. The outer end of the arm receives the outer end of a piston rod 96 extending from a cylinder 98, the piston rod being attached to the arm 96 by bolt 100. The cylinder 98 may be actuated by air or hydraulic fluid and, when actuated, serves to rotate shaft 62.

In the right hand side of FIG. 1 a solenoid 102 is supported to plate 16. The solenoid has a plunger 104 extending from it which is connected by a bolt 106 to an arm 108 which in turn is connected to shaft 62. Solenoid 102 is actuated by current supplied to connectors 110. This merely demonstrates that the brake mechanism of the invention may be operated by any type of device, either hydraulic, pneumatic, electrical or, it can be seen that the shaft 62 can be rotated by mechanically applied force.

OPERATION OF THE INVENTION

Figure 2:
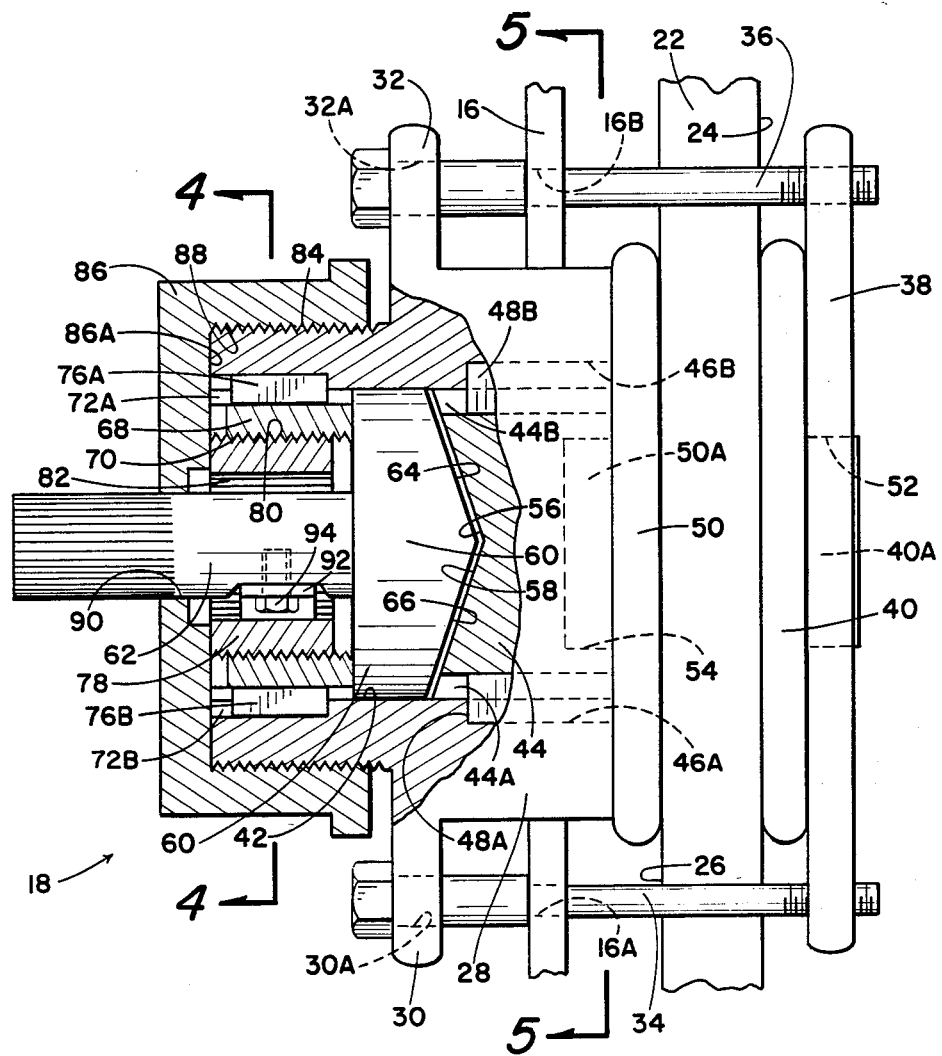
FIG. 2 is a view, shown partially in cross-section, of the essential components of the brake system of this invention showing the brake housing and internal parts of it and showing a portion of the brake disc.
Figure 3:
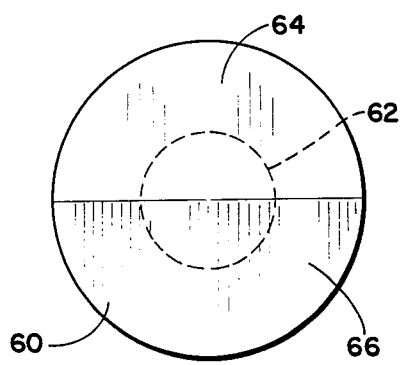
FIG. 3 is an end view of the actuator employed as a part of the brake mechanism.

Referring to FIG. 2 the operation of the invention will be described. When force is applied to rotate shaft 62 the actuator 60 is rotated a few degrees. The inner action of the actuator face formed by planes 64 and 66 with the forward face formed by planes 56 and 58 of the pad support 44 causes the pad support to be displaced within the housing in the direction towards brake disc 22. This forces pad 50 against the brake inboard surface 26. Since the bolts 34 and 36 supporting the housing 28 to plate 16 are slideable within the plate, the housing can be slightly moved with respect to the plate. Thus the force of pad 50 against the brake disc 22 is compensated by the equally applied force to the outboard face 24 of the brake disc by pad 40. The brake disc is thus squeezed between the pads and the amount of pressure applied by the pads is determined by the amount of torque applied to shaft 62.

Shaft 62 can rotate in either direction however, the method of adjusting the brake system depends upon a selected direction of rotation of the shaft. The brake adjustment can be understood by referring to FIGS. 2 and 4. When shaft 62 is rotated in the direction to apply braking force it is assumed, referring to FIG. 4, that the shaft is rotated clockwise. If the actuator 60 is positioned properly relatively to the pad support 44, the amount of rotation necessary to fully apply brake pressure against disc 22 will be less than that which would cause the outer end 92A of the pawl member to move to the next adjacent slot 82. Therefore, upon release of force on the shaft 62 it would return to its position with the outer end of the pawl arm 92 in the same slot. However, as wear on the pads occur or other adjustments become necessary so that more degrees of rotation of the shaft are required to apply brake pressure, then the shaft will rotate so that the outer end of the pawl member will fall into the next adjacent slot 82. When this occurs, and upon release of the brake, wherein the shaft rotates back to its normal position, the tubular ratchet members 78 will be rotated a few degrees, the number of degrees depending upon the number of slots 82 divided into 360°. This rotation will cause threaded advancement of the locator member 68, moving it in the rearward direction, that is displacing the locator member in a direction toward the brake disc 22. This serves to thereby position the actuator 60 closer to the pad support 44. With the pawl member 92 engaging a new slot it will continue to return to that slot until the degrees of rotation required on the shaft to apply sufficient brake pressure increases to the point where the pawl member falls into another slot, to again cause the locator member 68 to axially advance, moving the actuator 60 in the direction towards the brake disc 22. The device is thus self compensating.

An important advantage of the brake system of the present invention is that it allows two separate systems for applying brake action. One system may be hydraulic or pneumatic, as represented by cylinder 98. The other is electrical, as represented by solenoid 102. The controls for the electric brake systems will be mounted in the cab of the truck at convenient access to the operator. By using the electric brake system in conjunction with the pneumatic or hydraulic brake system the operator has two complete systems available. If one system fails the operator has two complete systems available. If one system fails the other can be used. Thereby the operator has a redundant brake system for upmost safety.

As indicated in the above specifications, any means of rotating a shaft 78 will operate the brakes, including mechanical means. Thus, by the use of levers, linkage rods, and cables connected from the cab unit to rotate one of the shafts 78, a dependable emergency brake system can be obtained which can be used in the event of failure of the other system.

As previously indicated, the actual application of the principles of the invention may employ apparatus of different appearances than those illustrated herein which is deemed to be a preferred embodiment at the time of the preparation of this disclosure.

While the invention has been described with a certain degree of particularity it is manifest that many changes may be made in the details of construction and arrangement of components without departing from the spirit and scope of the invention. The invention is not to be limited to the specific embodiments set forth herein for purposes of exemplification, but is to be limited only by the scope of the attached claim or claims, including the full range of equivalency to which each step or element thereof is entitled.

What is claimed is:
1. A brake system for a vehicle having an axle rotatably supporting a wheel hub, comprising:

a brake disc coaxially positioned on a vehicle axle, the disc having inboard and outboard parallel planar surfaces;

a housing supported by the vehicle in proximity to said disc, the housing having a forward end and a rearward end, the rearward end facing said disc, the housing having an opening therein the longitudinal axis of which is perpendicular the disc planar inboard surface;

a pad support slideably and non-rotatably received in said housing opening at the housing rearward end, the pad support on its forward end being defined by two planes intersecting a plane of the pad support longitudinal axis at equal angles whereby in cross-section the pad support forward end defines an obtuse V;

an actuator rotatably supported within said housing opening having a shaft portion extending externally of the housing forward end, the actuator having a rearward face defined by two planes intersecting at equal angles to a plane of the shaft axis, the end surface of the actuator defining an obtuse V, the rearward end face of the actuator engaging said pad support forward end;

a first brake pad affixed to said pad support rearward end;

an outboard pad support means affixed to said housing and extending past said disc outboard planar surface;

a second brake pad affixed to said outboard pad support mean spositioned in close proximity to said disc outboard surface, whereby when said actuator shaft is rotated said actuator rearward face reacts with said first pad support forward face to displace said pad support towards said disc inboard surface and as said housing is deflected by contact of said first pad with said disc force is applied to move said second pad against said disc outboard surface;

a tubular actuator locator slideably and non-rotatably supported within said housing opening having a rearward end in engagement with said actuator forward end, the interior tubular surface being threaded;

a tubular ratchet member having external threads and being threadably positioned within said tubular actuator locator, the interior diameter of the ratchet member being greater than the external diameter of said actuator shaft and having paralleled, evenly spaced slots therein in planes of the tubular axis, said actuator locator and ratchet member being axially concentric about said actuator shaft; and a pawl member affixed at one end to said actuator shaft and extending in a plane perpendicular the shaft axis, the other end engaging said slotted interior surface of said ratchet member.

2. A brake system according to claim 1 including:
a plate member supported to said vehicle in a plane parallel to and spaced from said disc inboard surface, the plate member having two spaced apart openings therein; and a bolt means slideably received in said plate member opening, said bolt members serving to support said housing and said outboard pad support means.

3. A brake system according to claim 2 including:
an adjustable actuator locator means within said housing in contact with said actuator forward end to selectably position said actuator whereby the amount of rotation of said actuator shaft to apply selected force of said pads against said disc may be controlled.

* * * * *